Sept. 3, 1929.  R. L. HAWKINS  1,726,825
VIBRATION DAMPER
Filed Dec. 5, 1925   5 Sheets-Sheet 3

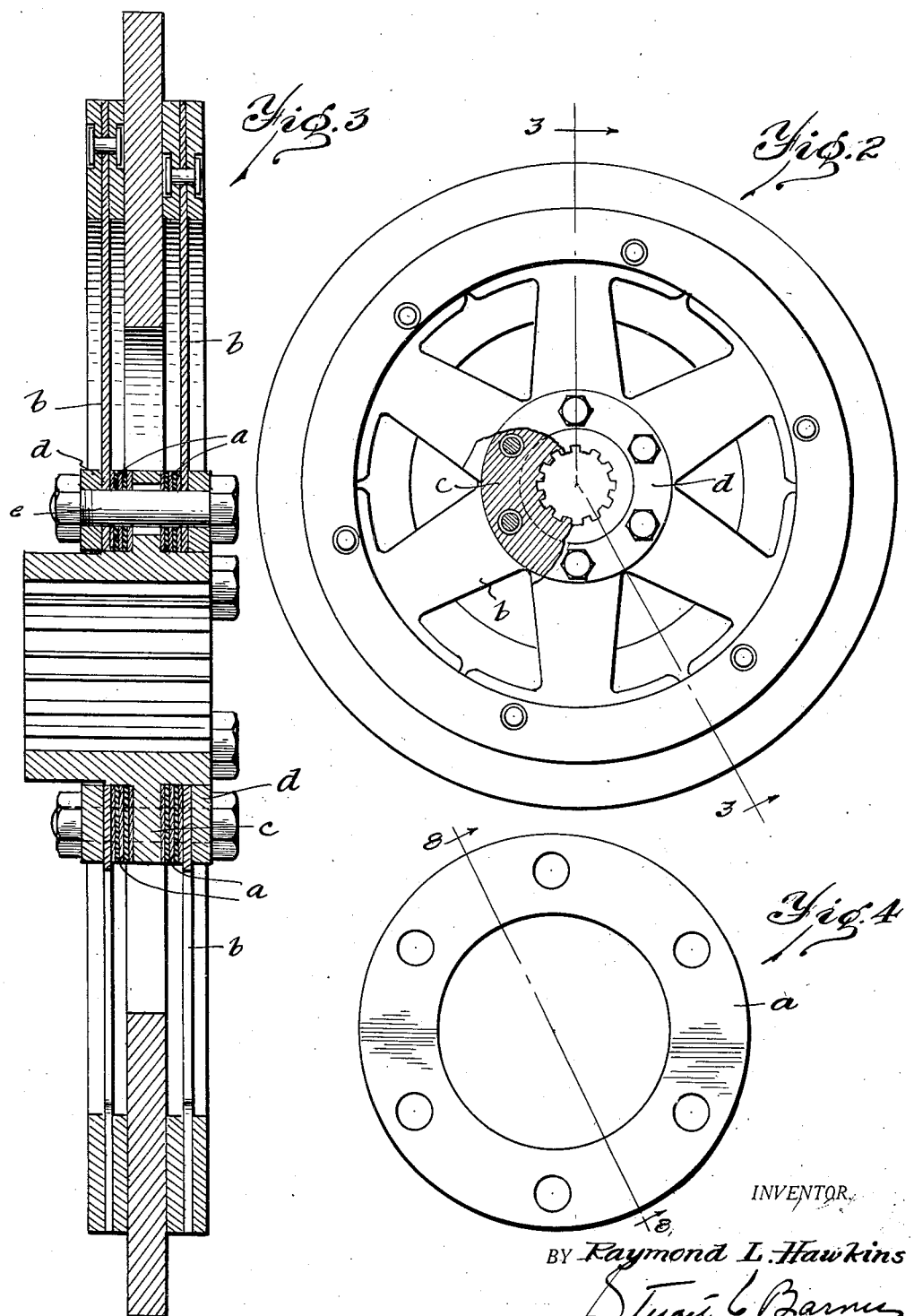

INVENTOR.
Raymond L. Hawkins
BY
Stuart C. Barnes
ATTORNEY.

Sept. 3, 1929.  R. L. HAWKINS  1,726,825
VIBRATION DAMPER
Filed Dec. 5, 1925   5 Sheets-Sheet 4
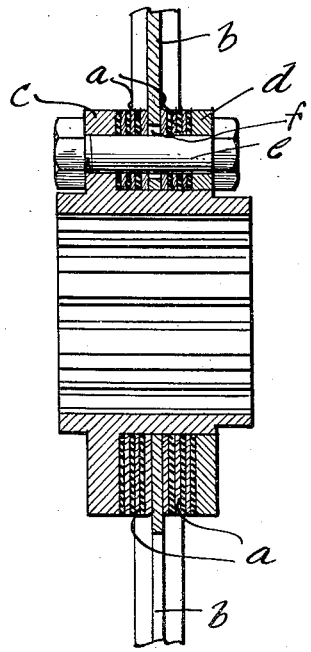
Fig. 9
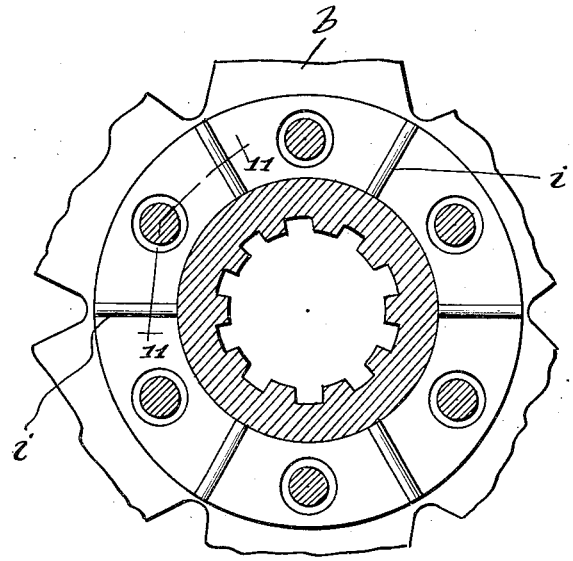
Fig. 10
Fig. 12
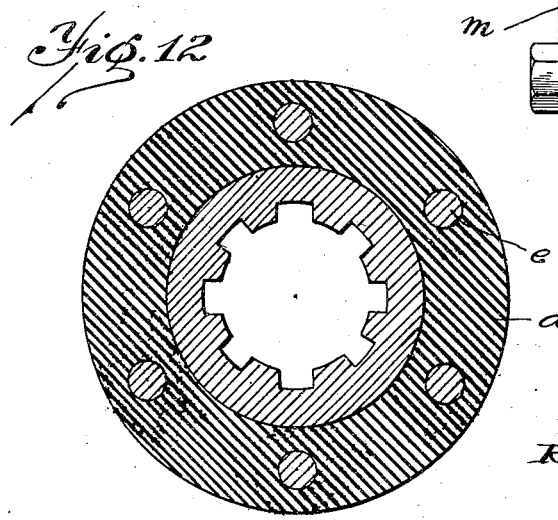
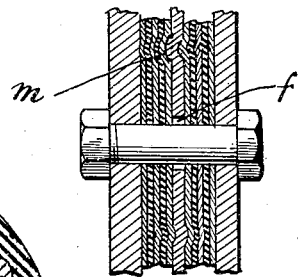
Fig. 11
INVENTOR.
Raymond L. Hawkins
BY
Stuart C Barnes
ATTORNEY.

Sept. 3, 1929.   R. L. HAWKINS   1,726,825
VIBRATION DAMPER
Filed Dec. 5, 1925   5 Sheets-Sheet 5

INVENTOR.
Raymond L. Hawkins
BY Stuart C. Barnes
ATTORNEY.

Patented Sept. 3, 1929.

1,726,825

UNITED STATES PATENT OFFICE.

RAYMOND L. HAWKINS, OF DETROIT, MICHIGAN, ASSIGNOR TO LONG MANUFACTURING COMPANY, OF DETROIT, MICHIGAN, A CORPORATION OF MICHIGAN.

VIBRATION DAMPER.

Application filed December 5, 1925. Serial No. 73,460.

This invention relates to clutches. It is the object of the invention to provide a non-metallic deformable element between the driven disc and its hub of such a character that it will not permit the driven disc to wobble or move out of its plane, and which nevertheless will dampen vibrations and ease the shock when sudden changes are made in the load. Furthermore, this element permits a nice adjustment of the disc to make it run in its proper plane. Preferably the elements are so arranged that a slight amount of yield is permitted, which is calculated to dampen vibrations and relieve the shocks. This will be more fully explained hereinafter.

Referring to the drawings:

Fig. 2 is an elevation of a modified form of clutch parts such as shown in Fig. 3.

Fig. 3 is a longitudinal section on the line 3—3 of Fig. 2.

Fig. 4 is an elevation of one of the deformable units such as shown in Fig. 3.

Figure 6:
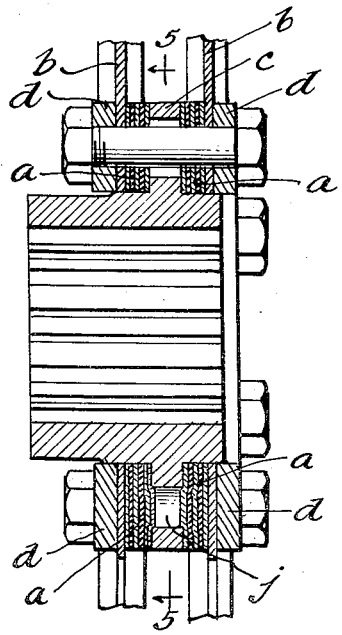
Figure 5:
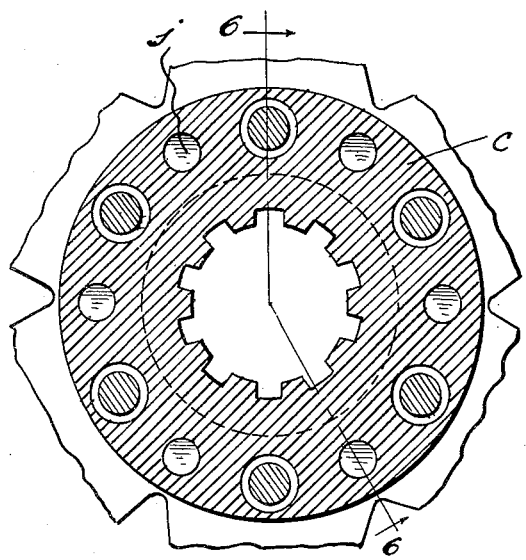
Figure 7:
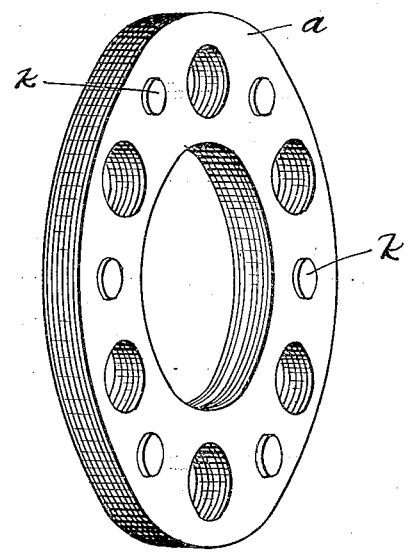

Figs. 5, 6 and 7 are views embodying the slightly modified form of cushion element, Fig. 5 being a section on line 5—5 of Fig. 6 and Fig. 6 being a section on line 6—6 of Fig. 5.

Figure 8:

Fig. 8 is a section taken on the line 8—8 of Fig. 4.

Figs. 9 and 10 are views showing still another modified form of cushion element.

Fig. 11 is a section on the line 11—11 of Fig. 10.

Figure 1:
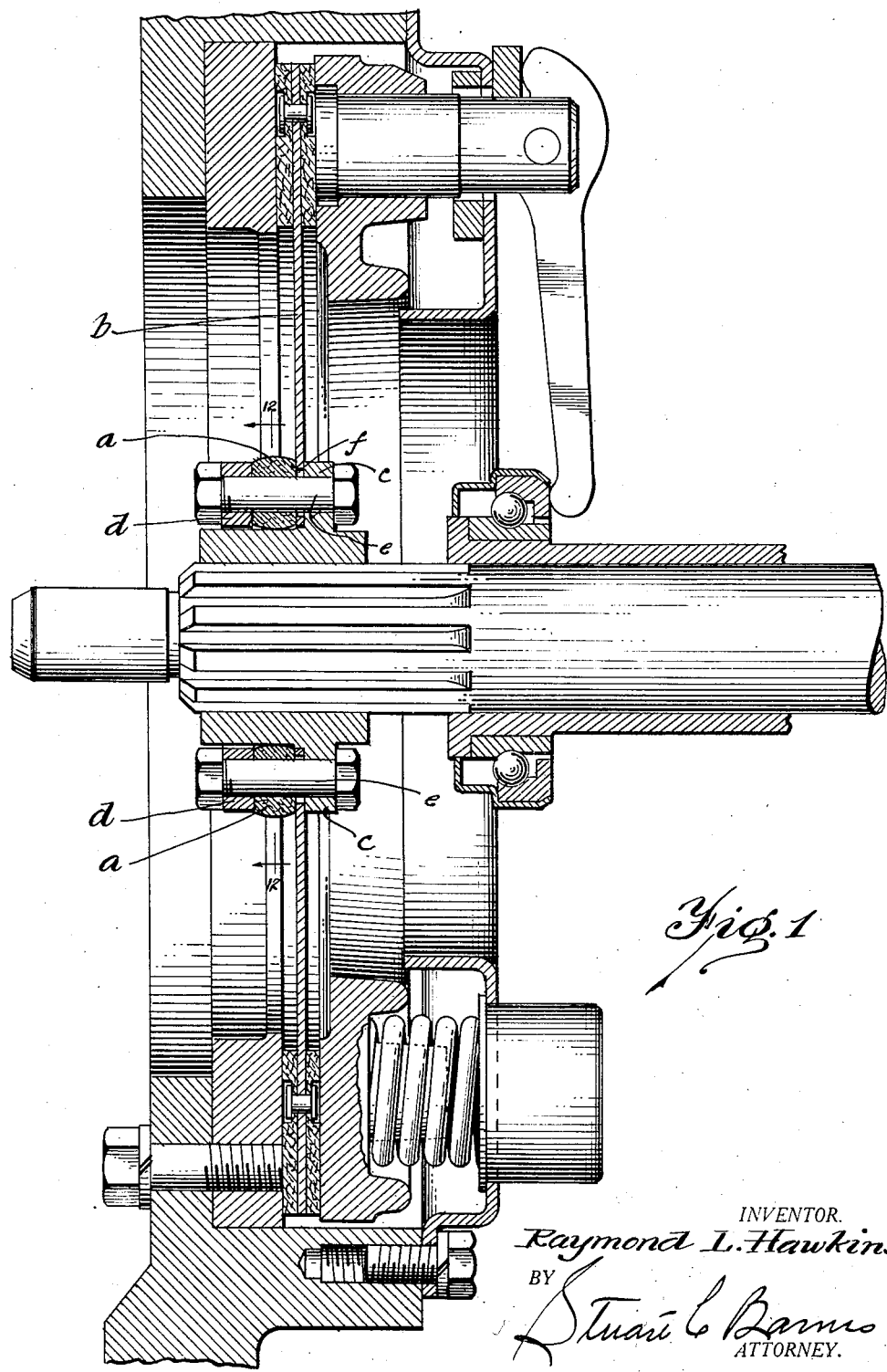
Fig. 1 is a longitudinal section of a clutch equipped with my improvement.

Fig. 12 is a section on the line 12—12 of Fig. 1.

Figures 13, 14, 15:
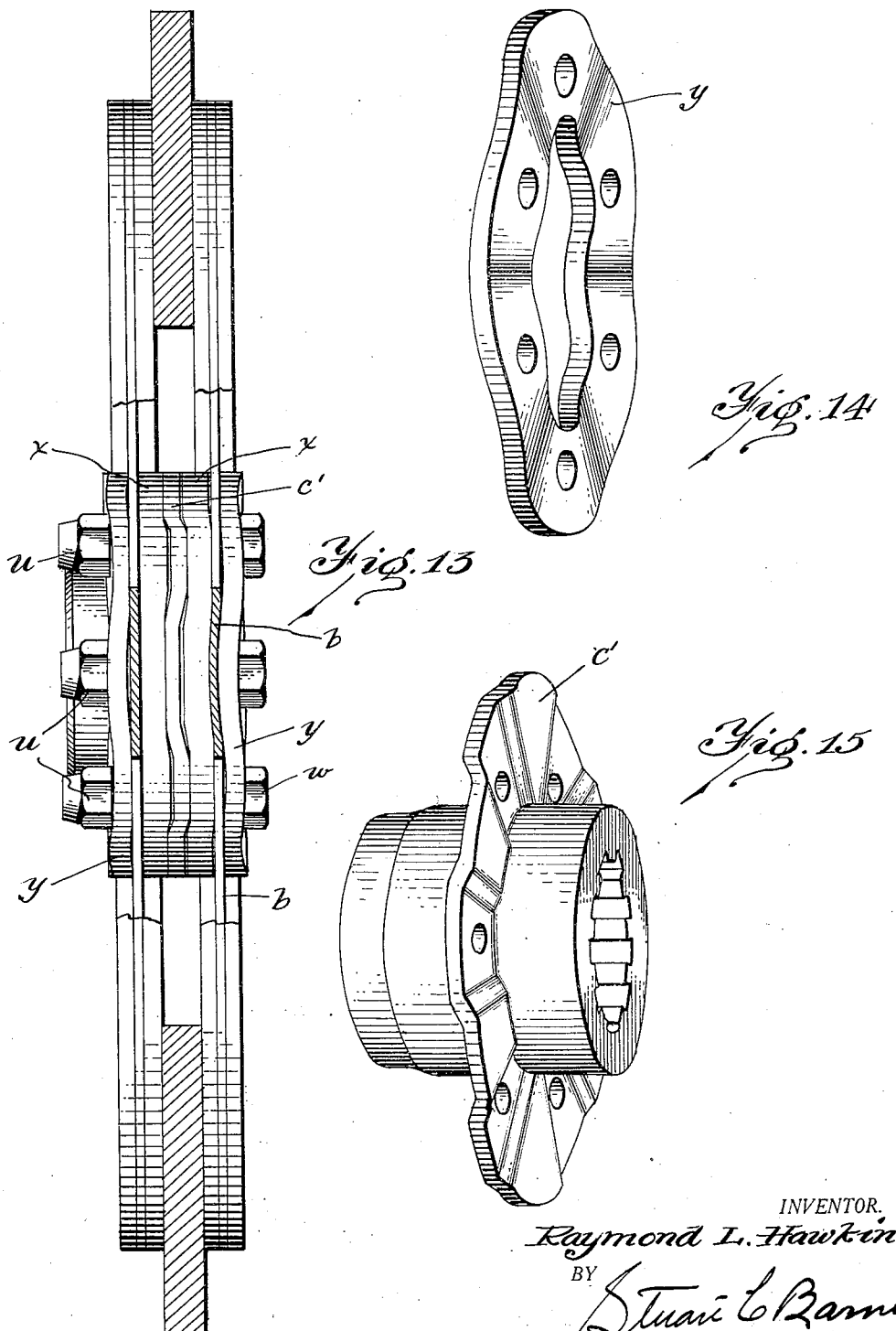

Fig. 13 is a side elevational view of another modified form of construction.

Fig. 14 is a perspective view of one of the warped exterior plates.

Fig. 15 is a perspective view of the middle plate.

It is not broadly new to insert a flexible element between the driven disc and its hub. This has been accomplished by supporting the driven disc by means of a yieldable ring on the hub. This construction, however, has been objectionable for the reason that it allows the disc to yield sidewise as well as torsionally, and results in an undesirable wobbling of the disc. My present invention gives the necessary yield torsionally, but does not permit any sidewise movement of the disc by reason of such connection.

To this end I bolt a yieldable ring $a$ up against the driven disc $b$ where the center of this disc abuts the hub collar $c$. Preferably a metallic ring $d$ is used to jam this cushioning ring $a$ against the center of this disc. The ring $a$ shown in Fig. 1 is a plain ring of deformable material such as rubber, while the rings shown in Figs. 3, 4 and 8 are rubber impregnated fabric. Preferably, the rings $x$ of Figs 13 to 15 are rubber impregnated fabric, but of course they might be made of other deformable material.

Preferably where the bolts $e$ pass through the center of the disc I leave considerable clearance, say $\frac{1}{16}$th of an inch on each side of the bolt at the perforation $f$. These bolts are drawn up very tightly, and consequently the deformable ring is tightly clamped against the driven disc. This deformable ring is preferably constructed of fabric discs vulcanized together.

In the construction shown in Fig. 3, the enlarged perforation which permits a slight relative movement between the hub and driven disc is shown in the collar of the hub, as is also the case in Fig. 6, while in the other forms the enlarged perforation is in the driven disc. It is immaterial in which the clearance occurs, but preferably where a plurality of driven discs are used I utilize the collar for the clearance.

In the form of the invention shown in Figs. 5, 6 and 7, the face of the deformable ring is provided with spots $k$ adapted to fit in openings $j$ of the collar $c$ of the hub. This gives a little more positive resistance to slippage. Another form is shown in Figs. 9, 10 and 11, wherein the center of the driven disc has shallow ribs $i$ struck out, adapted to engage in grooves $m$ in the deformable ring.

In Figs. 13 to 15 inclusive there is provided a central hub collar $c'$ which is crimped as clearly shown in Fig. 15. Preferably two non-metallic deformable rings $x$ are used, one on either side of the hub collar $c'$. The driven discs are now slipped over the hub and finally the warped metallic rings $y$. The bolts $w$ pass through perforations in the rings $y$, driven discs, deformable rings $x$, and the hub collar $c'$, the nuts $u$, when turned down tightly clamping these parts together. It will be noticed how the deformable rings are bent to conform to the surface contour of the crimped hub collar and the exterior warped metallic rings $y$. This construction serves to more positively clamp the deformable rings between the driven discs and hub collar. The driven discs are also slightly crimped to correspond to the irregular contour of the rings $y$ and hub collar $c'$.

It will be apparent that with the deformable ring located as it is, that the driven disc is tightly clamped against lateral movement, that there is permitted a certain amount of yield torsionally resisted by the surface distortion of the deformable ring, especially in view of the small amount of lost motion permitted. This torsional yield not only relieves the sudden shocks by sudden changes of the load, but also dampens the vibrations in the driven parts to the rear of the motor so that these cannot reach a periodicity with the vibrations of the motor and set up very objectionable vibrations throughout the chassis and running gear. Furthermore, it will be readily seen that any tendency of the disc not to run exactly true, can be more or less overcome by tightening the deformable ring tighter on one side than on the other.

Preferably the perforations in the driven discs are relatively large to provide clearance around the bolts to permit relative movement between the hub and driven discs, this relative movement being resisted by the surface contour of the deformable rings.

This relative movement between the parts near the hub allows about one-eighth of an inch ($\frac{1}{8}''$) movement at the periphery of the driven disc.

What I claim is:

1. In a clutch, the combination of a driven disc member, a hub member provided with a collar, a deformable ring for jamming against the center of the disc, means passing through the ring, the disc, and the collar for fastening the parts together, said means having clearance with respect to one of the members for the purpose of permitting a relatively small amount of relative movement resisted by the surface distortion of the deformable ring.

2. In a clutch, the combination of a driven disc provided with a frictional clutching face, a hub provided with a collar, a deformable ring constructed of vulcanized fabric discs and bolts for jamming the ring, the center of the disc, and the collar together.

3. In a clutch, the combination of a driven disc, a hub provided with a collar, a deformable ring constructed of vulcanized fabric and bolts for jamming the deformable ring, the center of the disc and the collar together, one of the first two mentioned members being provided with some clearance about the bolts to provide a limited relative movement resisted by the deformable ring.

4. In a clutch, the combination of a driven disc, a hub provided with a collar whose engaging face has an irregular contour, a deformable member arranged along with said disc and collar, and means for fastening the parts together but permitting a relatively small amount of relative movement between the disc and hub collar, said movement resisted by the surface distortion of the deformable member.

5. In a clutch, the combination of a driven disc, a hub provided with a collar which is crimped to provide its engaging face with alternate ridges and depressions, a deformable member arranged along with said disc and collar, a metallic ring whose engaging face has an irregular contour corresponding to the surface contour of the collar, said driven disc being bent adjacent the hub to conform to the surface contour of the ring and hub collar, and means passing through the ring, disc, deformable member and collar for fastening the parts together, said means having clearance with respect to one of the members for the purpose of permitting a relatively small amount of relative movement resisted by the surface distortion of the deformable member.

6. In a clutch, a clutch member which comprises two parts, one of which is adapted to drive the other, a positive driving connection between the parts which permits only a limited relative movement between them, and a yieldable element in association with the two parts, said yieldable element having an interlocking surface to surface engagement with at least one of the parts, which permits such relative movement but which resists the same by surface distortion of the yieldable element.

7. In a clutch, a clutch member which comprises two parts, one of which is adapted to drive the other, and a yieldable element having a connection with the two parts through which the driving power is communicated, at least one of the connections consisting of an interlocking surface to surface engagement which permits limited relative movement as between the said two parts by surface distortion and substantially non-compressible action of the yieldable element, but which resists slippage as between the yieldable element and the thus engaged part.

8. In a clutch, a clutch member which comprises two parts, one of which is adapted to drive the other, a connection between the two parts which permits only a limited relative movement between them, and a yieldable element in association with the two parts, said yieldable element having an interlocking surface to surface engagement with at least one of the parts, which permits but resists such relative movement by surface distortion of the yieldable element, and which tends to keep the two parts in proper relative position.

9. In a clutch, a clutch member which comprises two parts, one of which is adapted to drive the other, and a yieldable element having a connection with the two parts through which the power is communicated, at least one of the connections consisting of an interlocking surface to surface engagement effected by irregular formation of at least one of these parts which permits limited relative movement as between the said two parts by surface distortion of the yieldable element, but which movement does not effect any substantial compression of the yieldable element.

10. In a clutch, a clutch member which comprises two parts, one of which is adapted to drive the other, a connection between the two parts which permits only a limited relative movement between them, and a yieldable element in association with the two parts, said yieldable element having an interlocking surface to surface engagement with at least one of the parts, said interlocking engagement being effected by irregular formation of one of the engaging parts, whereby slippage between the yieldable element and the engaged part is resisted so as to resist the relative movement between the said two parts by surface distortion of the yieldable element.

11. In a clutch, the combination of a disc member, a hub provided with a collar, and a yieldable element clamped together with the collar and the disc member, the said disc member and collar arranged to have only a limited relative movement which is resisted by the said yieldable element.

12. In a clutch, the combination of a disc member, a hub provided with a collar, a yieldable element clamped with the disc member and the collar, and a positive driving connection between the disc member and the collar, said positive connection permitting limited relative movement between the disc member and collar which is resisted by the said yieldable element.

13. In a clutch, a disc member provided with a frictional engaging surface, a hub having a collar facing the central part of the disc member, a yieldable element, means for clamping the disc member, the collar and the yieldable element together, said clamping means permitting limited relative movement as between the disc member and collar which is resisted by the yieldable element, at least one of the said clamped members being deformed so as to present an irregular surface which abuts against the yieldable element.

14. In a clutch, a disc member having a frictional engaging surface, a hub member having a collar adapted to face one side of the disc member, a ring member fitting over the hub and facing the opposite side of the disc, a yieldable element of vulcanized fabric also fitting over the hub, all of said members having aligned bolt openings, bolts extending through said openings for clamping the members together, the bolt openings in at least one of the members being larger than the cross section of the bolt, and the bolt openings in at least one of the other members being of substantially the same size as the cross section of the bolts, whereby limited relative movement between these members is permitted, which movement is resisted by the yieldable element.

15. In a clutch, the combination of a driving member having a fixed plane of rotation, a driven disc member, a hub for the disc, and adjustable connecting devices connecting the disc and hub, said devices being adjustable to true the rotation of said disc.

16. In a clutch, the combination of a driving member of fixed rotation, a driven disc member, a hub for the disc, adjustable means including a yieldable element for connecting the disc member and hub, said means being adjustable to true the rotation of said disc member.

17. In a clutch, the combination of a disc member, a hub for the disc having a collar, a yieldable element disposed between the disc member and collar, means for clamping the disc, collar and yieldable element together, said means being adjustable to vary the clamping pressure whereby adjustment may be made to true the rotation of the disc.

18. In combination, a shaft having a flanged sleeve thereon, a rubber insulator and a clutch plate, screw threaded members for clamping the three together, said members being extended through the plate, the openings in the plate through which they extend being larger than the members to afford a material clearance between them and the edges of the openings.

In testimony whereof I have affixed my signature.

RAYMOND L. HAWKINS.